United States Patent [19]

Angove

[11] Patent Number: 4,697,352

[45] Date of Patent: Oct. 6, 1987

[54] HIGHWAY PROFILE MEASURING DEVICE

[76] Inventor: Richard D. Angove, 200 Rockwell, Ames, Iowa 50010

[21] Appl. No.: 7,523

[22] Filed: Jan. 28, 1987

[51] Int. Cl.[4] .............................................. B61K 9/00
[52] U.S. Cl. ...................................................... 33/523
[58] Field of Search ................................. 33/521, 523

[56] References Cited

U.S. PATENT DOCUMENTS

| | | |
|---|---|---|
| 1,769,521 | 7/1930 | Lamb . |
| 2,175,496 | 10/1939 | Troyer ................................... 33/523 |
| 2,344,216 | 3/1944 | Kaydon .................................. 33/523 |
| 3,222,787 | 12/1965 | Young ................................. 33/521 X |
| 3,593,120 | 7/1971 | Mandula . |
| 3,857,183 | 12/1974 | Plasser et al. . |
| 4,135,304 | 1/1979 | Kuntz . |
| 4,265,022 | 5/1981 | Noguchi et al. . |

OTHER PUBLICATIONS

Iowa Department of Transportation Highway Division "Method of Test for Determining Smoothness Using the 25 Foot California Profilometer".

Concrete Pipe Machinery Co. "McCracken Profile Reader".

Primary Examiner—Harry N. Haroian
Attorney, Agent, or Firm—Zarley, McKee, Thomte, Voorhees & Sease

[57] ABSTRACT

The surface profile measuring device of the present invention comprises first and second elongated frame members, each having opposite forward and rearward ends. The frame members are pivotally connected at their adjacent ends by hinge so as to be longitudinally aligned in an end-to-end relationship and so as to be pivotal about a transverse horizontal axis. The frame members are supported by wheels adjacent the opposite ends of the device and by a mid-wheel adjacent the pivotal connection of the two frame members. A frame extension rod is rigidly secured to the first frame member and extends rearwardly therefrom. The extension rod terminates in an actuator end having a curved surface. A lever arm is pivotally mounted to the second frame member and has a forward end with a curved surface engaging the curved surface of the extension rod. As the device travels over a surface to be measured, any irregularities in the surface cause the mid-wheel to be vertically displaced such that the frame members pivot with respect to one another. In response to such pivotal movement of the frame members, the extension rod pivots the lever arm so that the recording pen moves a distance corresponding to the vertical displacement of the mid-wheel. The rearward end of the lever arm is connected to a recording assembly which continuously and accurately graphs the vertical movement of the mid-wheel and thereby records the profile of the surface.

20 Claims, 9 Drawing Figures

U.S. Patent  Oct. 6, 1987  Sheet 1 of 2  4,697,352
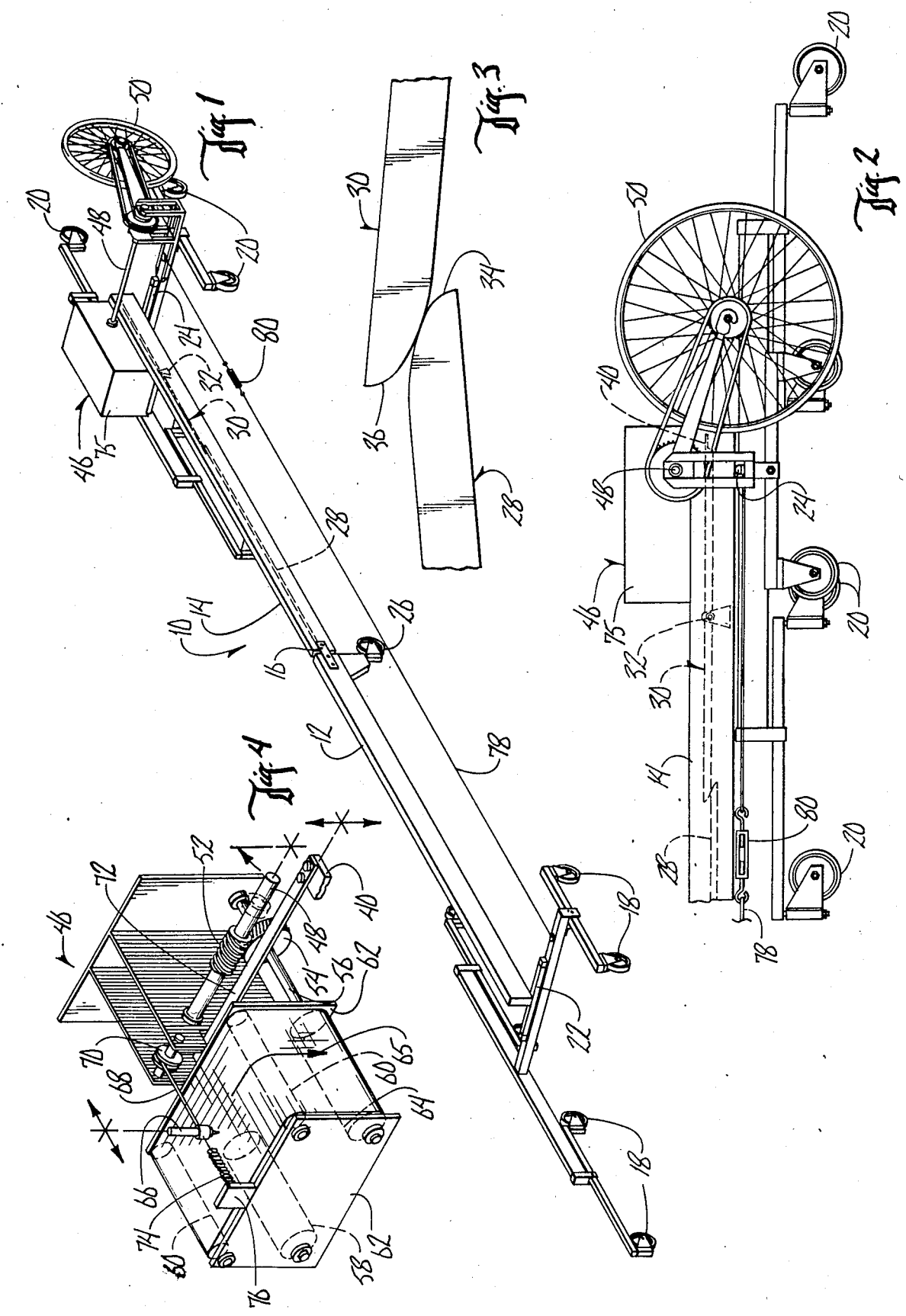

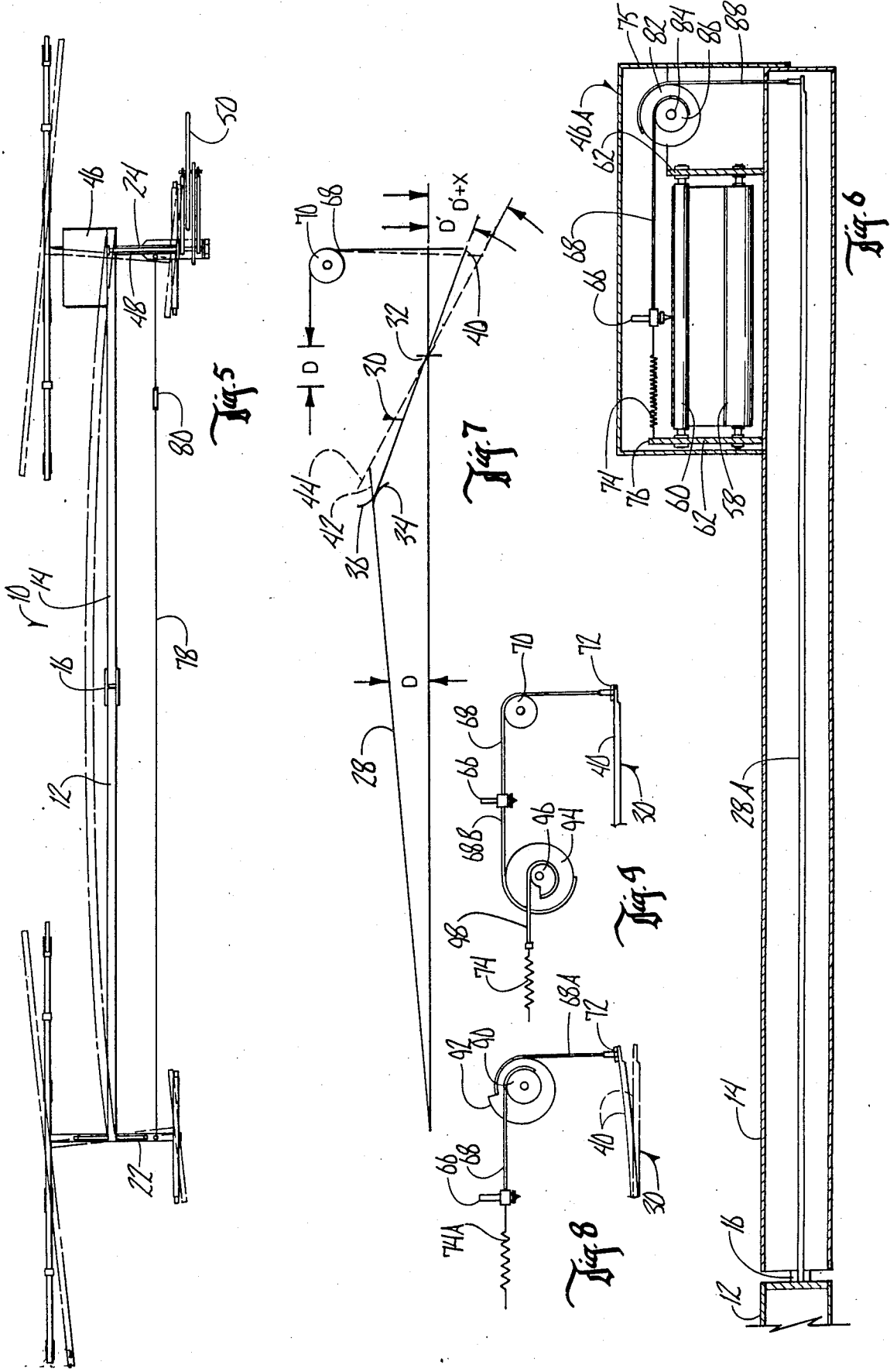

4,697,352

HIGHWAY PROFILE MEASURING DEVICE

BACKGROUND OF THE INVENTION

Roads are generally constructed within certain smoothness tolerances. Due to the high speeds of motor vehicles on many roads, it is important that the roads be relatively smooth. Accordingly, devices have been developed for checking or reading the profile of a road to assure that the road is constructed within the permitted tolerances. Prior art devices have been constructed with a 25 foot truss frame and a wheel which is pivotally mounted at the mid-point of the frame. The wheel moves vertically in response to imperfections in the road surface, with such movement of the wheel being recorded on a graph.

These profile measuring devices are heavy due to the long truss frame and therefore require two people to operate the device. Also, such heavy construction of the frame adds significantly to the cost of the device.

Therefore, a primary objective of the present invention is the provision of a surface profile measuring device which continuously and accurately records imperfections in the surface being checked.

Another objective of the present invention is the provision of a surface profile measuring device which is light weight, economical to manufacture, easy to operate, and durable in use.

These and other objectives will become apparent from the following description of the present invention.

SUMMARY OF THE INVENTION

The surface profile measuring device of the present invention includes elongated first and second frame members which are hinged together in an end-to-end relationship for pivotal movement about a transverse horizontal axis. Each frame member comprises a single, hollow tubular element, such that the device weighs approximately one-half as much as prior art devices constructed with a rigid truss frame. Support wheels are located at each end of the device, as well as below the pivotal connection at the midpoint of the device.

A frame extension rod is rigidly secured to the first frame member and extends rearwardly therefrom. This extension rod is housed within the hollow second frame member and terminates in a curved actuator surface. A lever arm is pivotally mounted within the second frame member and has a forward end engaging the curved surface of the extension rod and an opposite rearward end operatively connected to a recording graph.

As the device moves along a surface to be measured, the frame members will pivot relative to one another when imperfections are encountered by the wheels. In response to such pivotal movement of the frame members, the extension rod pivots the lever arm about its fulcrum. Accordingly, the rearward end of the lever arm moves a distance corresponding to the vertical displacement of the middle wheel relative to a reference plane extending through the contact points of the front and rear wheels with the surface being measured. Such movement of the lever arm is recorded continuously on the graph.

The device also includes an elongated cable having opposite ends secured to the device at locations laterally spaced apart from the forward and rearward ends, and tensioning means for applying tension to the cable. As the device moves along a super-elevated curve, the tensioning means is adjusted so that the mid-wheel will follow the same curved path as the front rear wheels of the device. Thus, all the wheels of the device will follow the horizontal curve of the surface.

BRIEF DESCRIPTION OF THE DRAWINGS

FIG. 1 is a perspective view of the surface profile measuring device of the present invention.

FIG. 2 is a partial side elevational view of the device.

FIG. 3 is an enlarged partial side elevational view of the extension rod and lever arm of the device.

FIG. 4 is a perspective view of the recording means of the present invention.

FIG. 5 is a top view of the device, showing the flexibility of the device when used on superelevated curves.

FIG. 6 is a partial side sectional view showing an alternative embodiment of the recording means of the present invention.

FIG. 7 is a schematic view showing the movement of the extension rod and lever arm of the device, wherein the horizontal scale is equal to that of FIG. 5 but with an exaggerated vertical scale.

FIGS. 8 and 9 show alternate means for compensating for spring tension in the recording means so as to produce an accurate graph.

DETAILED DESCRIPTION OF THE DRAWINGS

The device of the present invention is generally designated by the reference numeral 10 in the drawings. Device 10 includes a first elongated frame member 12 and a second elongated frame member 14. First and second frame members 12 and 14 are pivotally connected by a hinge means 16 so as to be disposed in an end-to-end relationship, and so as to be pivotable with respect to one another about a transverse horizontal axis. A plurality of front wheels 18 and rear wheels 20 are mounted on wheel frames 22 and 24, which in turn are connected to the forward and rearward ends of the device such that wheels 18 and 20 rollably support the opposite ends of the device. A mid-wheel 26 is connected to one of the frame members 12 or 14 so as to support the frame members adjacent and below the pivotal connection at hinge means 16.

A frame extension rod 28 is rigidly secured to first frame 12 by any convenient means, and extends rearwardly therefrom. Preferably, second frame member 14 is hollow and extension rod 28 is housed therein. Also, housed within second frame member 14 is a lever arm 30. Lever arm 30 is pivotal about a horizontal axis 32, as best seen in FIG. 2. While extension rod 28 is shown to extend to the approximate longitudinal mid-point of second frame member 14, an axis 32 is shown to be at the approximate mid-point of lever arm 30, it is understood that the relative lengths of extension rod and lever arm, and the location of the pivot axis of lever arm 30 are relative to one another and may vary accordingly without departing from the scope of the present invention.

Extension rod 28 terminates in a rearward end having a curved surface 34. Similarly, lever arm 30 has a forward end terminating in a curved surface 36. These curved surfaces are best shown in FIG. 3 and their purpose will be described hereinafter.

As device 10 moves along a surface whose profile is being measured or checked, the wheels encounter imperfections in the surface. Such imperfections cause frame members 12 and 14 to pivot with respect to one another, with midwheel 26 moving in a substantially vertical plane in response to such imperfections. The upward or downward movement of midwheel 26 relative to a reference plane extending through the points of contact of front wheels 18 and rear wheels 20 with the surface is transferred by extension rod 28 to lever arm 30. In other words, as mid-wheel 26 moves upwardly and downwardly, extension rod 28 which is rigidly secured to first frame member 12 also moves upwardly and downwardly, thereby causing lever arm 30 to pivot about axis 32. Due to the relative dimensions of rod 28 and lever arm 30, the rearward end 40 of lever arm 30 moves a distance equal to the vertical displacement of mid-wheel 26.

The curved surfaces 34 and 36 of extension rod 28 and lever arm 30, respectively, are important in transmitting the vertical displacement of mid-wheel 26 to an equivalent displacement of rearward end 40 of lever arm 30. As shown in FIG. 7, curved surface 34 of extension rod 28 engages curved surface 36 of lever arm 30 such that when mid-wheel 26 moves a vertical distance D in response to imperfections in the road surface, lever arm 30 is pivoted about axis 32 such that rearward end 40 of lever arm 30 also moves a substantially equivalent distance D'. In comparison, if the rearward end of extension rod 28 terminated in a flat surface as indicated by the reference numeral 42 in FIG. 7, and if the forward end of lever arm 30 terminated in a flat surface as indicated by the reference numeral 44 in FIG. 7, the rearward end 40 of lever arm 30 would move a distance $D'+X$ which is greater than the vertical displacement D of mid-wheel 26. Thus, the curved surfaces 34 and 36 of extension rod and the lever arm, respectively, allow an accurate measurement of the road profile to be obtained.

As mid-wheel 26 rises above the reference plane, the point of contact on surface 34 moves towards the extremity of arm 28 while the point of contact on surface 36 remains constant. Conversely, when mid-wheel 26 falls below the reference plane, the contact point on surface 34 remains constant while the contact point on surface 36 moves towards the extremity of arm 30.

The movement of rearward end 40 of lever arm 40, which corresponds to the vertical displacement of mid-wheel 26 in response to imperfections in the surface, is recording by recording means 46. More particularly, recording means 38 includes a primary drive shaft 48 which is operatively connected to a drive wheel 50 by sprocket assembly 52. Drive wheel 50 engages the road surface such that rotation thereof imparts rotation to drive shaft 48. Drive shaft 48 has a worm gear 52 in meshing engagement with a gear 54 mounted on a paper drive shaft 56, as best seen in FIG. 4. A paper roll 58 and a pair of idler rollers 60 are rotatably mounted between a pair of support plates 62. A paper collection roller 64 is mounted on drive shaft 56 between support plates 62. The paper (not shown) extends from paper roll 58, around idler rollers 60, and is secured to collection roll 64. Thus, rotation of drive wheel 50 imparts rotation to primary drive shaft 48, which causes collection roller 64 to turn and thereby pull the paper from paper roll 58 and around idler rollers 60, as indicated by arrow 65 in FIG. 4.

A marking utensil 66, such as a pen, is positioned above the paper. Pen 66 is operatively connected to the rearward end 40 of lever arm 30 by means of a string or wire 68 extending around a pulley 70. The opposite end of string 68 is secured to a bar 72 which is secured to rearward end 40 of lever arm 30. A spring 74 having opposite ends connected to pen 66 and a flange 76 on the far support plate 62 maintains tension on string 68. Preferably, spring 74 has constant tension. Thus, a vertical displacement D of midwheel 26 moves rearward end 40 of lever arm 30 a distance D', which in turn causes pen 66 to move an equal distance D across the width of the paper and thereby record the corresponding vertical displacement D of mid-wheel 26, as shown in FIG. 7. Recording means 38 is mounted within a housing 75 for protection from the weather elements and other physical damage.

More particularly, when the contact point of midwheel 26 with the surface being measured is below the reference plane, that being a plane extending through the contact points of front wheels 18 and rear wheels 20 and the surface, the rearward end of lever arm 30 is moved upwardly so that pen 66 is pulled forwardly across the paper by spring 74. Similarly, when the contact point of mid-wheel 26 is above the reference plane, the rearward end of lever arm 30 is pivoted downwardly, thereby causing pen 66 to be pulled rearwardly across the paper by string 68. Thus, a continuous and accurate recording of road surface irregularities is provided by device 10.

It is understood that recording means 46 may have other construction than that described without departing from the scope of the present invention. Also, recording means 38 can be positioned anywhere along frame member 14.

Device 10 also includes an elongated cable 78 extending substantially along the length of the device. Cable 78 is attached at opposite ends to wheel frames 22 and 24 at points laterally spaced apart from frame members 12 and 14. A tensioning means 80, such as a turn buckle or the like, is provided on cable 78 for adjusting the tension thereof. By increasing the tension on cable 78, frame members 12 and 14 can be flexed or bowed, as shown by dotted lines in FIG. 5, such that mid-wheel 26 will travel along the same paths as the forward end of first frame member 12 and the rearward end of second frame member 14 as the device travels along a super-elevated curve. In the absence of cable 78, mid-wheel 26 will follow a path at a lower elevation than the opposite ends of the device when on a banked or super-elevated curve. As an alternative to bowing frame members 12 and 14, the frame members can be hinged together to allow pivoting movement about a vertical axis so as to accommodate super-elevated curves.

FIG. 6 shows an alternative embodiment of the profile measuring device. In this embodiment, a frame extension rod 28A is rigidly secured to first frame member 12 and extends rearwardly within second frame member 14. The rearward end of extension rod 28A is operatively connected to a recording means 38A. Recording means 38A is similar to the recording means 38 described previously, except that lever arm 30 and the connecting bar 72 are eliminated. String 68, which has one end connected to pen 66, is attached at its opposite end to a cam wheel 82 which is rotatably mounted upon a cam shaft 84. The rearward end of extension rod 28A is connected to a pulley 86 mounted on cam shaft 84 by a string or wire 88. Thus, when mid-wheel 26 is displaced in response to irregularities in the surface being measured, the rearward end of extension rod 28A moves in a slight arcuate path upwardly or downwardly. When the end of extension rod 28A moves downwardly, cam wheel 82 is rotated in a clockwise direction by string 88. When the end of extension rod 28A moves upwardly, the tension in spring 74 rotates cam wheel 82 in a counterclockwise direction. Cam wheel 82 has a surface which, when the wheel is rotated, causes pen 66 to move a distance equivalent to the vertical displacement of mid-wheel 26.

The above description of the operation of the recording means 38 and 38A is directed to the ideal structural situation wherein spring 74 has constant tension and wherein extension rod 28 and lever arm 30 are sufficiently rigid and stiff so as to maintain a linear profile during operation of device 10. However, if a non-constant tension spring 74A is utilized, due to the length and lightweight construction of rod 28 and arm 30, and since spring 74A keeps curved surfaces 34 and 36 in contact with each other, there is a tendency for rod 28 and arm 30 to bow or bend due to the increasing tension in spring 74A as it stretches. As the displacement of the rearward end of lever arm 30 increases, the tension in spring 74A increases, thereby bending the lever arm to a greater extent than when the spring tension is at a minimum. Such bending introduces error into the graph produced by the recording means 38.

To eliminate the distortion of the lever arm 30 and extension rod 28, and thus error in measuring the road profile, it is necessary to compensate for the spring tension. The means for providing such compensation or correction may take several forms. First, curved surfaces 34 and 36 can be modified so as to compensate for the spring tension distortion. Since the tension in spring 74A is known or can be ascertained, surfaces 34 and 36 can be curved accordingly to compensate for the spring tension.

Secondly, as shown in FIG. 8, pulley 70 can be replaced by a wheel 90 and an attached cam 92 having an increasing radius. String 68 is secured to wheel 90 while a string extension 68A is secured to cam 92 and extends to connecting bar 72. The surface of cam 92 compensates for the curvature of lever arm 40 caused by the tension in spring 74A by moving pen 66 a greater distance than the displacement of the second end of the lever arm, such greater distance being equivalent the movement of mid-wheel 26. Under ideal situations where lever arm 40 is stiff, the lever arm would move to the position shown by dotted lines in FIG. 8.

A third alternative for accommodating the spring tension is shown in FIG. 9. In this figure, a string extension 68B is secured to a compensation wheel 94. A compensation cam 96 having an increasing radius is mounted on wheel 94. Spring 74A has one end secured to cam 96 by a line 98. When the rearward end of lever arm 40 moves, cam 96 is rotated by string extension 68B so as to maintain uniform spring tension at all times. Thus, any bending of lever arm 40 is constant throughout the displacement thereof. Accordingly, pen 66 will accurately record the displacement of mid-wheel 26.

It is understood that any of the alternatives for compensating for spring tension distortion can also be utilized on the alternative embodiment of device 10 shown in FIG. 6.

From the foregoing, it can be seen that the present invention accomplishes at least all of the stated objectives.

What is claimed is:

1. A surface profile measuring device, comprising:
   an elongated first frame member having opposite forward and rearward ends;
   an elongated second frame member having opposite forward and rearward ends;
   hinge means pivotally connecting the frame members in an end-to-end relation;
   front wheel means on the forward end of said first frame member for rollably supporting the front end of the first frame member on the surface;
   rear wheel means on the rearward end of said second frame member for rollably supporting the rearward end of the second frame member on the surface;
   the points of engagement between the surface and the front and rear wheel means defining a reference plane extending through such points of engagement;
   mid-wheel means adjacent the hinge means for rollably supporting the rearward end of the first frame member and the forward end of the second frame member on the surface and for pivoting said first and second frame members relative to one another when said mid-wheel means engages a surface elevation varying from the reference plane;
   a frame extension rod rigidly secured to said first frame member and extending rearwardly therefrom and terminating in a curved actuator surface;
   a lever arm pivotally mounted on said second frame member and having a rearward end and a forward end with a curved surface engaging said curved surface of said frame extension rod whereby, in response to pivotal movement of said frame members, said extension rod pivots said lever arm such that said rearward end of said lever arm moves a distance corresponding to the vertical displacement of said mid-wheel means relative to said reference plane; and
   recording means operatively connected to said rearward end of said lever arm for continuously recording the vertical displacement of said mid-wheel means.

2. The device of claim 1 wherein said curved surface of said extension rod and said curved surface of said lever arm are substantially spiral in cross-section.

3. The device of claim 1 further comprising arching means for flexing the device along its length such that said midwheel means will follow the same curved path as said forward end of said first frame member and said rearward end of said second frame member as said device moves along a superelevated curve of the surface.

4. The device of claim 3 wherein said arching means includes a cable extending along the substantial length of said device and having opposite ends secured to the device at locations laterally spaced apart from the forward end of said first frame member and the rearward end of said second frame member, respectively, and tensioning means for applying tension to said cable.

5. The device of claim 1 wherein said second frame member is hollow and said frame extension rod and said lever arm are housed substantially within said second frame member.

6. The device of claim 1 wherein said first and second frame members each comprise a single, elongated, hollow tubular element.

7. The device of claim 1 further including compensation means for overcoming distortion of the lever arm thereby producing an accurate recording of the vertical displacement of said mid-wheel means.

8. The device of claim 7 wherein said compensation means includes a cam surface operatively connected to said recording means.

9. The device of claim 1 wherein said recording means includes a length of paper, marking means operatively connected to said rearward end of said lever arm, and tension means for urging said marking means to a first position corresponding to said reference plane, whereby movement of said rearward end of said lever arm moves said marking means across the width of said paper a distance equivalent to the vertical displacemenet of said mid-wheel means.

10. The device of claim 9 wherein said recording means further includes advancement means for moving the paper in a direction parallel to its length as said device moves along said surface being measured.

11. The device of claim 8 wherein said tension means is a constant tension spring.

12. A surface profile measuring device comprising:
first and second elongated frame members each having opposite forward and rearward ends;
hinge means pivotally connecting the frame members in a longitudinally aligned end-to-end relation;
front wheel means on the forward end of said first frame member for rollably supporting the front end of the first frame member on the surface;
rear wheel means on the rearward end of said second frame member for rollably supporting the rearward end of the second frame member on the surface;
the points of engagement between the surface and the front and rear wheel means defining a reference plane extending through such points of engagement;
mid-wheel means on the pivot connection means for rollably supporting the rearward end of the first frame member and the forward end of the second frame member on the surface and for pivoting said first and second frame members relative to one another when said mid-wheel means engages a surface elevation varying from the reference plane;
a frame extension rod rigidly secured to said first frame member and extending rearwardly therefrom and terminating in an actuator end;
a curved cam surface pivotally mounted on said second frame member and being operatively connecting to said actuator end of said frame extension rod whereby, in response to pivotal movement of said frame members, said extension rod pivots said curved cam surface such that a point on the surface moves a distance corresponding to the vertical displacement of said mid-wheel means relative to said reference plane; and
recording means operatively connected to said cam surface for continuously recording the vertical displacement of said mid-wheel means.

13. The device of claim 12 further comprising arching means for flexing the device along its length such that said midwheel means will follow the same curved path as said forward end of said first frame member and said rearward end of said second frame member as said device moves along a superelevated curve of the surface.

14. The device of claim 13 wherein said arching means includes a cable extending along the substantial length of said device and having opposite ends secured to the device at locations laterally spaced apart from the forward end of said first frame member and the rearward end of said second frame member, respectively, and tensioning means for applying tension to said cable.

15. The device of claim 12 wherein said second frame member is hollow and said frame extension rod is housed substantially within said second frame member.

16. The device of claim 12 further including compensation means for overcoming distortion of the lever arm thereby producing an accurate recording of the vertical displacement of said mid-wheel means.

17. The device of claim 16 wherein said compensation means includes a cam surface operatively connected to said recording means.

18. The device of claim 12 wherein said recording means includes a length of paper, marking means operatively connected to said cam surface, and tension means for urging said marking means to a first position corresponding to said reference plane, whereby movement of said cam surface moves said marking means across the width of said paper a distance equivalent to the vertical displacement of said mid-wheel means.

19. The device of claim 18 wherein said recording means further includes advancement means for moving the paper in a direction parallel to its length as said device moves along said surface being measured.

20. The device of claim 18 wherein said tension means is a constant tension spring.

* * * * *